US006447051B1

(12) United States Patent
Lukomskiy

(10) Patent No.: US 6,447,051 B1
(45) Date of Patent: Sep. 10, 2002

(54) EXTENDED CAB PICKUP TRUCK WITH CAB LOAD CONTAINER

(76) Inventor: Alexandr V. Lukomskiy, 3309 Bethany Rd., Alpharetta, GA (US) 30004

( * ) Notice: Subject to any disclaimer, the term of this patent is extended or adjusted under 35 U.S.C. 154(b) by 0 days.

(21) Appl. No.: 09/920,165

(22) Filed: Aug. 1, 2001

Related U.S. Application Data

(60) Provisional application No. 60/225,241, filed on Aug. 15, 2000.

(51) Int. Cl.$^7$ ................................................. B60J 7/00
(52) U.S. Cl. ................. 296/183; 296/37.6; 296/190.11; 296/100.03
(58) Field of Search ................ 296/183, 37.6, 296/26.08, 37.1, 37.8, 37.13, 190.11, 100.03

(56) References Cited

U.S. PATENT DOCUMENTS

| | | | | |
|---|---|---|---|---|
| 2,530,097 A | * | 11/1950 | Troth | 296/183 |
| 4,480,868 A | * | 11/1984 | Koto | 296/190.11 |
| 4,613,183 A | * | 9/1986 | Kesling | 296/183 |
| 4,752,095 A | * | 6/1988 | Brady | 296/37.6 |
| 4,938,519 A | * | 7/1990 | Schlachter | 296/37.6 |
| 4,941,702 A | * | 7/1990 | Southward | 296/37.6 |
| 5,305,512 A | * | 4/1994 | Ward | 296/183 |
| 5,524,951 A | * | 6/1996 | Johnson | 296/183 |
| 5,709,329 A | * | 1/1998 | Johnson | 108/137 |
| 5,895,086 A | * | 4/1999 | Carico | 296/37.6 |
| 5,934,727 A | * | 8/1999 | Storc et al. | 296/37.6 |
| 6,065,794 A | * | 5/2000 | Schlachter | 296/37.6 |
| 6,224,138 B1 | * | 5/2001 | Adsit et al. | 296/37.6 |
| 6,234,560 B1 | * | 5/2001 | Hunt | 296/100.03 |
| 6,260,916 B1 | * | 7/2001 | Hunt | 296/183 |
| 6,276,735 B1 | * | 8/2001 | Champion | 296/37.6 |
| 6,276,751 B1 | * | 8/2001 | Ikarashi et al. | 296/183 |
| 2001/0030448 A1 | * | 10/2001 | Wilson | 296/183 |
| 2002/0014505 A1 | * | 2/2002 | Lance et al. | 296/37.6 |

FOREIGN PATENT DOCUMENTS

DE  30 03 430  * 8/1981

* cited by examiner

Primary Examiner—Stephen T. Gordon
Assistant Examiner—Kiran B. Patel
(74) Attorney, Agent, or Firm—Thomas, Kayden, Horstemeyer & Risley

(57) ABSTRACT

An extended cab pickup truck (10) has split rear seats (32, 34) and a load receiving container (40) is positioned between the rear seats. The rear wall (20) of the cab defines a rear opening (52) below the rear window (18) and a rearwardly facing opening (50) of the container registers with the rear opening of the cab at the level of the load bed of the truck. An external door (54) selectively closes the rear opening. The container has an internal opening (62) that is in communication with the cab for access to the load receiving container.

14 Claims, 2 Drawing Sheets

EXTENDED CAB PICKUP TRUCK WITH CAB LOAD CONTAINER

CROSS REFERENCE

Applicant claims the benefit of and priority with respect to Provisional Patent Application Ser. No. 60/225,241, filed Aug. 15, 2000.

FIELD OF THE INVENTION

This invention involves a pickup truck with additional storage and hauling space located in the passenger cab of the truck and opening into the bed of the truck.

BACKGROUND OF THE INVENTION

Pickup trucks are now made with elongated or "extended" cabs with back seats. This provides the vehicle with more passenger space, so that the vehicle can function not only as a work vehicle for hauling items in the rear "bed" of the truck, but also as a passenger vehicle, particularly for families with small to intermediate sized children.

In order to keep the overall length of the extended cab pickup truck from becoming too large, the bed of the truck is shortened somewhat. This tends to limit the length of the articles that can be carried by the extended cab pickup truck without opening the tailgate of the truck. For example, long boards, ladders, pipes and other elongated objects might not fit in the foreshortened bed of a pickup truck with an extended cab.

Therefore, there is a need to provide an extended cab pickup truck with a hauling capacity that is of sufficient length to haul elongated objects that would otherwise not fit into the conventional sized extended cab pickup truck.

SUMMARY OF THE INVENTION

Briefly described, the present invention relates to a pickup truck that has the extended cab configuration, which includes not only the conventional front seats, but the rear seats that are positioned behind the front seats and adjacent the rear wall of an extended cab. The rear wall of the passenger cab defines a rear wall opening that registers with the space above the load bed of the vehicle. The rear seats of the vehicle are spaced apart so as to straddle the rear opening in the rear wall of the cab, leaving a load space between the rear seats that is available for receiving the ends of elongated objects from the load bed behind the cab.

In a preferred embodiment, a load receiving container is centrally positioned at the floor in the rear portion of the passenger cab, between the rear seats and behind the front seats. The load receiving container defines a rearwardly facing load receiving opening that registers with the rear wall opening of the passenger cab so as to be in free communication with the space above the load bed of the truck. The load receiving container tends to confine the forward end of the elongated load placed therein, so that the end of the load received in the container cannot shift forwardly or laterally during normal operation of the vehicle.

Preferably, the load receiving container is located on the centerline of the truck so that the weight of the end of the load placed in the container is confined to the centerline of the truck.

If desired, the load receiving container can also include an upwardly facing internal opening that communicates inside the cab with a door or hatch that selectively opens and closes the internal opening. This provides the occupants of the cab access to the internal space of the load receiving container.

Likewise, a rear door or hatch can be hingedly mounted or otherwise mounted about the rear opening of the load receiving container so as to close the container to the outside atmosphere when a load does not project from the load bed of the truck into the cab. This permits the load receiving container to receive smaller articles without the hazard that the articles would inadvertently move through the rear wall opening of the passenger cab.

Another embodiment of the invention includes the extended cab vehicle with space behind the front seats but no rear seats. This allows the owner of the vehicle to purchase the vehicle without the rear seats but the vehicle has the capacity to receive the load receiving container, and also includes load receiving space straddling the container to increase the over all carrying capacity of the vehicle.

Thus, it is an object of this invention to provide an extended cab pickup truck with improved load carrying capacity.

Another object of this invention is to provide an extended cab pickup truck with a load receiving container positioned in the cab for receiving loads protruding from the load bed behind the cab.

Another object of this invention is to provide a convenient load receiving container inside the cab of an extended cab pickup truck which is accessible both from within the cab and from the load bed.

Other objects, features and advantages of the present invention will become apparent upon reading the following specifications, when taken in conjunction with the accompanying drawings.

DETAILED DESCRIPTION

Figure 1:
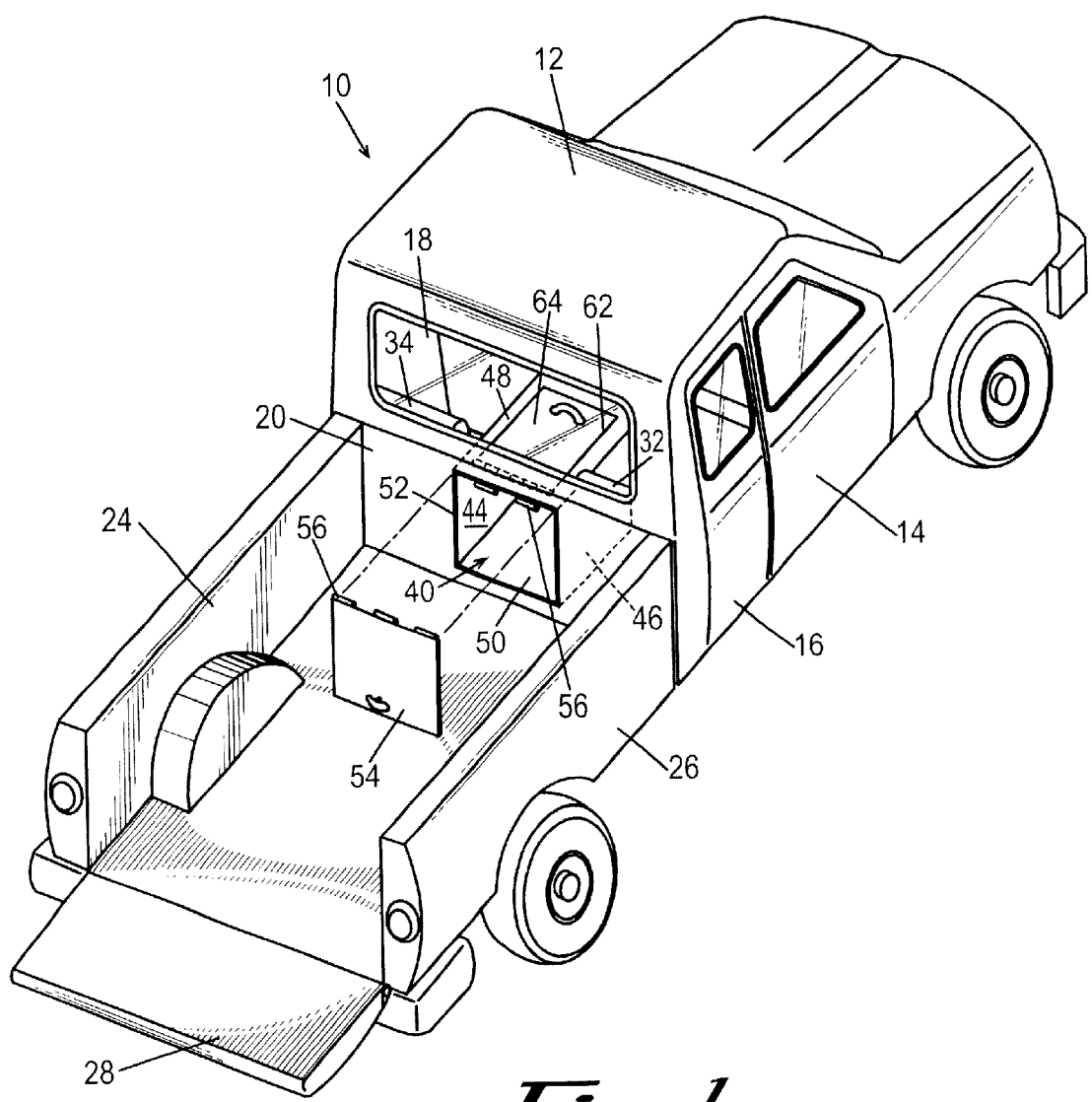
FIG. 1 is a perspective illustration of an extended cab pickup truck, showing the rear upper surfaces of the truck, showing part of the interior of the load receiving container, its rear opening, and with the external door removed for clarity.

Referring now in more detail to the drawings, in which like numerals indicate like parts throughout both views, FIG. 1 discloses an extended cab pickup truck 10 that includes a cab 12 having both front 14 and rear 16 doors on each side, with a rear window 18 positioned in the rear wall 20 of the cab.

Horizontal load bed 22 is positioned behind the extended cab 12, and the vertical side walls 24 and 26 are parallel to one another and extend upwardly from the sides of the load bed 22, in the conventional manner. Typically, a tailgate is hingedly connected to the rear edge of the load bed 22.

Figure 2:
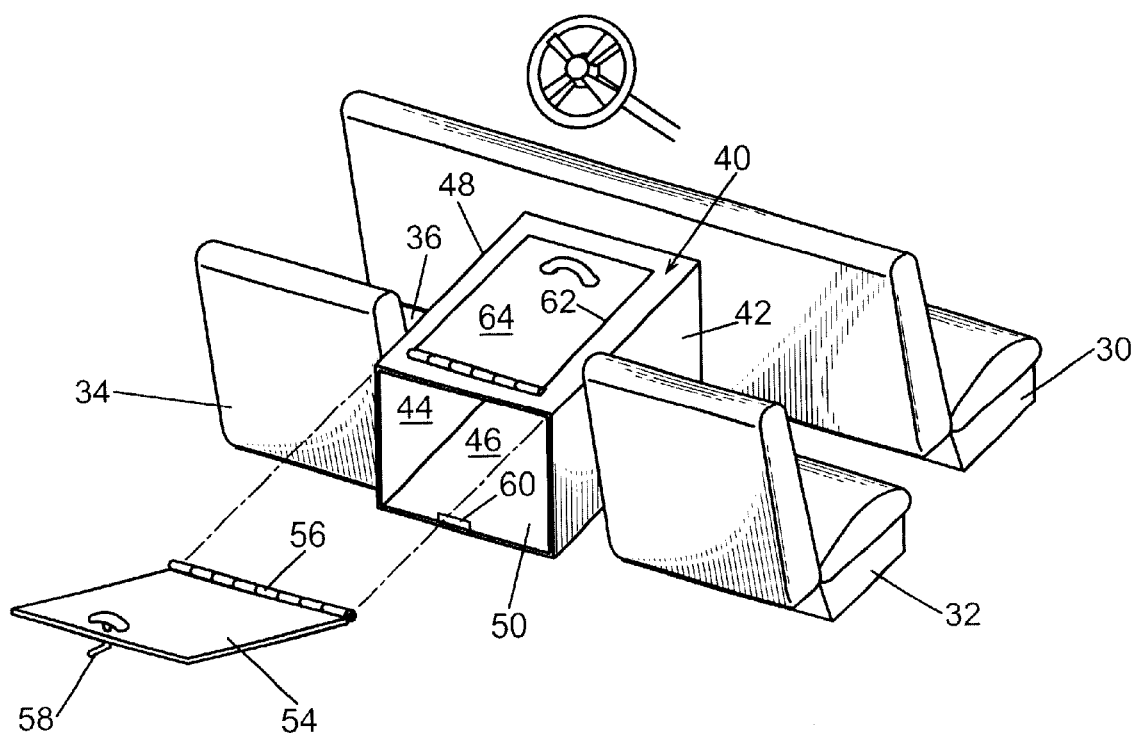
FIG. 2 is a perspective illustration of the front and rear seats of the extended cab pickup truck, showing the load receiving container positioned between the rear seats of the vehicle, and with the rear door or hatch shown displaced from its normal position for illustration purposes.

As illustrated in FIG. 2, front seats 30 and rear seats 32 and 34 are located in the cab. The front seats can be a "bench" seat or can be in the form of separate "bucket" seats which are spaced apart from one another. The front seats 30 are spaced from the rear wall 20 of the cab.

The rear seats 32 and 34 are spaced apart from each other and are located adjacent the rear wall 20 (FIG. 1) of the cab.

Therefore, the rear seats 32 and 34 and the front seats 30 define between them a load receiving space that is generally indicated at 36. A load receiving container 40 is positioned in the load receiving space 36, between the rear seats 32 and 34, so that the rear seats 32 and 34 straddle the load receiving container. The load receiving container is approximately rectangular, including opposed vertical side walls 42 and 44, opposed bottom wall 46 and top wall 48, and a front wall (not illustrated) positioned adjacent the front seats 30. The rear portion of the load receiving container defines a rearwardly facing opening 50. Rear wall 20 (FIG. 1) of the cab also includes a rear wall opening 52, with the rear wall opening 52 in registration with the load receiving container 40. Preferably, the load receiving container will be slightly smaller in height and breadth than the rear wall opening 52 in the cab so as to be telescopically inserted through the rear wall opening 52 of the cab. The load receiving container can be removed from within said cab by moving it rearwardly, telescopically through the rear wall opening of the cab. However, the load receiving container can be larger in height and width than the rear wall opening and installed without movement through the rear wall opening. Typically, the load receiving container will be firmly attached to the pickup truck by bolts (not shown) that can be removed for repair or replacement of the container. In some instances it might be desirable to remove the load receiving container from the cab and allow use of the space behind the front seats without the container.

External door 54 is hingedly mounted at the rear wall opening 52 of the rear wall of the cab 12 and functions to close the rearwardly facing opening 50 of the load receiving container. The external door 54 preferably is mounted to the rear wall 20 of the cab by the hinges 56. Preferably, the hinge structure 56 is located at the upper edge of the rear opening of the cab so that the external door can tilt upwardly and open the load receiving container to the load bed 22 of the vehicle and move to a closed position by gravity. Also, a latch 58 can be installed on the external door so as to register with the keeper 60 mounted to the cab or to the load receiving container, allowing the rear door 54 to be locked in its closed position. Alternatively, the external door 54 can be mounted to the internal load receiving container, at the upper edge of load receiving container 40 by means of a conventional hinge structure.

Although the external door 54 is disclosed in the preferred embodiment as being a bottom opening door with the hinge positioned on top, other types of doors and door connections can be used for attaching the external door in closed relationship about the rear wall opening 52 and the rearwardly facing opening 50 of the load receiving container 40, such as a side opening door with a hinge structure at a side edge of the door, or a releasable hatch, or a sliding door, or any door configuration that assures closure to the outside elements and safe operation of the vehicle.

Preferably, load receiving container 40 will include an internal opening such as the upwardly facing opening 62 in top wall 48, and an internal door such as hatch 64 is hingedly mounted to one edge of the internal opening 62 for selective opening and closing of the load receiving container 40 from inside the cab of the vehicle. This provides the passengers in the cab access to the load receiving container. The internal door can be mounted on a wall other than the top wall 48, if desired. However, the placement of the internal door 64 should not be positioned so as to be subject to being forced open by the load carried in the internal compartment of the load receiving container 40 due to abrupt movements of the pickup truck.

Another embodiment of the invention is the extended cab pickup truck as described but without rear seats. When in this configuration, the load receiving container will be straddled with extra space for receiving a larger load.

While a preferred embodiment of the invention has been illustrated and described herein, those skilled in the art will understand that variations and modifications of the invention can be made without departing from the spirit and concept of the invention, as limited by the following claims.

What is claimed is:

1. An extended cab pickup truck having a load bed and passenger cab positioned ahead of said load bed, said cab having a rear wall separating said load bed from said cab, a rear window in said rear wall, front seats positioned in said cab and rear seats positioned in said cab behind said front seats adjacent said rear wall, the improvement therein comprising:

said rear seats spaced apart from each other and defining therebetween a load receiving space in said cab behind said front seats, said rear wall defining a rear wall opening positioned below said rear window and between said rear seats and registering with said load bed for receiving objects extending from said load bed into said cab.

2. The extended cab pickup truck of claim 1, further including a load receiving container positioned in said cab in said space between said rear seats, said container defining an internal load receiving space and a rearwardly facing load receiving opening in registration with said cab rear wall opening, whereby loads can extend from said load bed through said load receiving opening and into said internal load receiving space of said load receiving container.

3. The extend cab pickup of claim 2, further including an external door adapted for selectively closing said rearwardly facing load receiving opening of said load receiving container.

4. The extended cab pickup truck of claim 3, wherein said external door is a hinged door.

5. The extended cab pickup truck of claim 3, wherein said external door is a sliding door.

6. The extended cab pickup truck of claim 2, wherein said load receiving container defines an internal access opening therein in communication with said cab so that a person within the cab has access to the load receiving space of said load receiving container.

7. The extended cab pickup truck of claim 4, and further including an internal door selectively closing said internal access opening of said load receiving container.

8. An extended cab pickup truck having a load bed and a passenger cab positioned ahead of said load bed, said passenger cab having a rear wall separating said load bed from said passenger cab, front seats positioned in said cab and defining a space with respect to said rear wall, the improvement therein comprising:

said rear wall defining a rear wall opening registering with said rear bed of said truck, a load receiving container extending between said rear wall and said front seats, said load receiving container defining an internal load receiving space and a rearwardly facing load receiving opening in registration with said rear wall opening.

9. The extended cab pickup truck of claim 8, further including a door selectively closing said rearwardly facing load receiving opening of said load receiving container.

10. The extended cab pickup truck of claim 8, wherein said rear wall opening is located at the level of said rear bed of said truck so that long objects can lie on said bed and extend through said rearwardly facing load receiving opening.

11. The extended cab pickup truck of claim 8, further including a rear window positioned in said rear wall above said rearwardly facing load receiving opening.

12. The extended cab pickup truck of claim 11, and further including rear seats in said cab straddling said load receiving container.

13. An extended cab pickup truck having a load bed and a passenger cab positioned ahead of said load bed, said cab having a rear wall separating said load bed from said cab, a rear window defined in said rear wall, and front seats positioned in said cab and spaced from said rear wall, the improvement therein comprising:

said rear wall defining a rear wall opening positioned below said rear window and registering with said load bed at a level for receiving ends of objects lying on said load bed, and an external door mounted to said cab for selectively closing said rear wall opening.

14. The extended cab pickup truck of claim 13, and further including a load receiving container positioned in said cab, said container defining a rearwardly facing load receiving opening in registration with said rear wall opening, an internal access opening in communication with said cab, and an internal door for selectively closing said access opening.

* * * * *